June 11, 1929.  H. MAGER  1,717,237

ARRANGEMENT FOR COOLING LIQUIDS OR FLUIDS

Filed July 8, 1925

INVENTOR
HERBERT MAGER
BY
ATTORNEYS

Patented June 11, 1929.

1,717,237

UNITED STATES PATENT OFFICE.

HERBERT MAGER, OF VIENNA, AUSTRIA.

ARRANGEMENT FOR COOLING LIQUIDS OR FLUIDS.

Application filed July 8, 1925, Serial No. 42,272, and in Austria February 7, 1925.

This invention relates to means for cooling liquids or fluids and essentially consists in passing the liquid to be cooled, by centrifugal force and in thin layers along the inner walls of rotating cylinders, which are of a good heat-conducting material (metal) and the outer walls of the said cylinders are subjected to the influence of a cooling medium (water or air).

The advantage of the means according to the present invention consists in that the liquid to be cooled is always brought into contact with the cooled wall in thin layers and that the part of the liquid in the middle of the tube is not without a cooling effect as is the case in the known tubular radiators. Further owing to the rotation of the cylinder, the entire surface of the latter is subjected to the influence of the cooling medium. Therefore both effects considerably increase the efficiency of the radiator.

Two modes of carrying out the present invention are shown by way of example on the accompanying sheet of drawings in which:—

Figure 1:
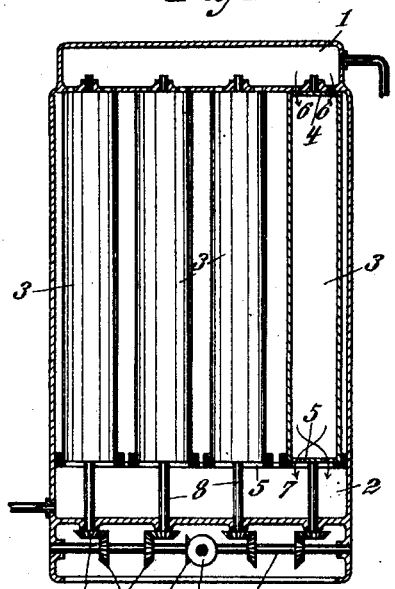
Fig. 1 illustrates a radiator for a motor-vehicle in sectional elevation.

The radiator consists of a top receptacle or casing 1, into which enters the warm cooling water coming from the engine, and of a bottom receptacle or casing 2, from which the cooled water is again supplied to the engine. These receptacles or casings are closed at all sides except for a corresponding number of perforations. Rotatable cylinders 3 preferably formed of sheet-metal are disposed in the space between the two casings. The top and bottom ends of the cylinders are closed by walls 4 and 5 respectively, provided with perforations 6 and 7 near the circumference or periphery. The shafts 8 of the cylinders are mounted in the horizontally disposed walls of the receptacles 1 and 2. The top walls 4 of the cylinders 3 are arranged close to the bottom wall of the top casing 1 and are packed with respect to the same. The bottom wall of the top casing is furnished with perforations, which are in alignment with the perforations 6 in the top wall of the cylinders. The warm water, supplied to the casing 1, passes through the perforations of this casing and the perforations 6 into the rotating cylinders, whereby after having passed through the rotating perforations the water is thrown against the inner walls of the cylinders and owing to the centrifugal force is spread out in thin layers over the said inner walls and runs downward along the same. The bottom part of the cylinders runs tightly packed in circular holes, provided in the top wall of the casing 2 and through which the water passes into the latter.

In the embodiment illustrated in Fig. 1 a suitable gear is provided for rotating the cylinders by means of the engine, the said gear comprising a bevel wheel 9 and a bevel wheel 10, in mesh with the wheel 9 and rotating a horizontally disposed shaft 11, to which are secured bevel wheels 12, which are in mesh with bevel wheels 13, keyed to the shafts 8 of the cylinders.

Figure 2:
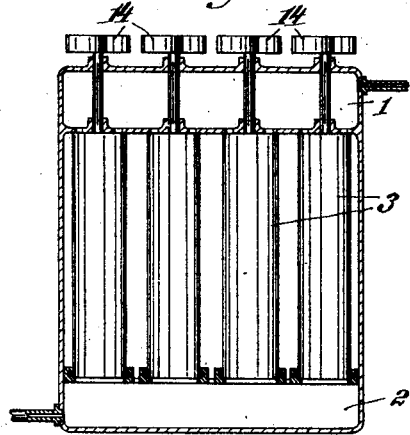
Figs. 2 and 3 show in sectional elevation and plan view respectively a radiator for flying machines.
Figure 3:
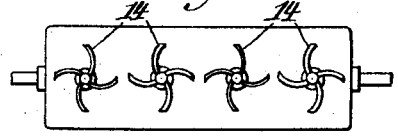

In the construction shown in Figs. 2 and 3, the cylinders are rotated by means of air vanes 14, which are secured to the ends of the extended shafts of the cylinders and the blades of which are curved. Owing to the air-current produced during the flight the vanes 14 and thus also the cylinders 3 are rotated.

Preferably the arrangement is such, that each pair of adjacent cylinders is rotated in the opposite direction.

Of course the present invention is not limited to the cooling of the engine of vehicles only, but may be employed generally for the cooling of different liquids or fluids.

I claim:—

1. In cooling means for liquids, a chamber for the liquid to be cooled provided with openings in its bottom, and a vertically rotating cylinder disposed beneath the openings of the chamber and having openings in its upper end wall adjacent the periphery thereof, whereby the liquid admitted to the cylinder through said openings will be thrown against the inner surface of the cylinder in thin layers and pass down along the said inner surface.

2. In cooling means for liquids, an upper liquid chamber having annularly arranged openings in its bottom, a discharge chamber, and a vertical rotating cylinder mounted between and connecting the said chambers and having annularly arranged openings in its upper end wall adapted to register with the openings of the upper chamber.

3. Means for cooling liquids, comprising an upper chamber having in its bottom a plurality of sets of annularly arranged openings, a lower discharge chamber, a plurality of cylinders mounted between and connecting the said chambers, the cylinders being arranged in pairs, each with its upper end below a set of openings of the upper chamber, each cylinder being provided with openings in its end walls, the openings in the upper end wall being annularly arranged, and adapted to register with the openings of the upper chamber and means for rotating each pair of adjacent cylinders in opposite directions.

4. Means for cooling liquids, comprising an upper liquid chamber having in its bottom a plurality of sets of annularly arranged openings, a lower discharge chamber, a plurality of cylinders having shafts and mounted between and connecting the chambers, each arranged with its upper end below a set of openings of the upper chamber, each cylinder being provided in its end walls with openings, the openings of the upper end wall being annularly arranged, and adapted to register with the openings of the upper chamber and a vane on the shaft of each cylinder for rotating the said cylinders.

5. Means for cooling liquids, comprising an upper liquid chamber having in its bottom a plurality of sets of annularly arranged openings, a lower discharge chamber, a plurality of vertical cylinders mounted between and connecting the chambers each arranged with its upper end below a set of the openings of the upper chamber, each cylinder being provided in its end walls with a plurality of openings adapted to register with openings of the upper chamber and having its shaft extending through the upper chamber, and a vane on the end of each shaft, the vanes being so arranged that adajcent cylinders will be rotated in opposite directions.

In testimony whereof I affix my signature.

HERBERT MAGER.